US012654634B2

(12) United States Patent (10) Patent No.: US 12,654,634 B2

Khogali (45) Date of Patent: Jun. 16, 2026

(54) VEHICLE TRIM PANEL ASSEMBLY

(71) Applicant: NISSAN NORTH AMERICA, INC., Franklin, TN (US)

(72) Inventor: Yasir Khogali, Plymouth, MI (US)

(73) Assignee: NISSAN NORTH AMERICA, INC., Franklin, TN (US)

( * ) Notice: Subject to any disclaimer, the term of this patent is extended or adjusted under 35 U.S.C. 154(b) by 489 days.

(21) Appl. No.: 18/180,107

(22) Filed: Mar. 7, 2023

(65) Prior Publication Data

US 2024/0300421 A1 Sep. 12, 2024

(51) Int. Cl.
| | |
|---|---|
| *B60R 16/02* | (2006.01) |
| *B60R 11/02* | (2006.01) |
| *B60R 13/02* | (2006.01) |
| *H02J 7/70* | (2026.01) |

(52) U.S. Cl.
CPC .............. *B60R 16/02* (2013.01); *B60R 13/02* (2013.01); *H02J 7/70* (2026.01); *B60R 11/02* (2013.01)

(58) Field of Classification Search
CPC . B60R 11/02; B60R 11/0205; B60R 11/0252; B60R 2011/0003; B60R 2011/0005; B60R 2011/0007; B60R 2011/0019; B60R 2011/0085; B60R 2011/0294; B60R 13/02; B60R 13/0237; B60R 13/0256; B60R 13/0262; B60R 2013/0287; B60R 16/02
See application file for complete search history.

(56) References Cited

U.S. PATENT DOCUMENTS

| | | | |
|---|---|---|---|
| 9,257,799 B2 * | 2/2016 | Stubbs | B60R 16/02 |
| 9,438,051 B2 | 9/2016 | Firman, II et al. | |
| 9,590,437 B2 | 3/2017 | Levy et al. | |
| 9,755,447 B2 | 9/2017 | Ries et al. | |
| 2009/0154150 A1 * | 6/2009 | Luyckx | F21L 4/085 |
| | | | 362/183 |
| 2011/0220430 A1 * | 9/2011 | Fowler | B60R 11/02 |
| | | | 180/90 |
| 2024/0300421 A1 * | 9/2024 | Khogali | H02J 7/0042 |

FOREIGN PATENT DOCUMENTS

| | | | | |
|---|---|---|---|---|
| CN | 2904577 Y | 5/2007 | | |
| CN | 204103118 U | 1/2015 | | |
| CN | 208522127 U | 2/2019 | | |
| CN | 111688602 A | 9/2020 | | |
| KR | 20070052942 A | * | 5/2007 | ............. B60R 11/02 |
| KR | 10-1570719 B1 | 11/2015 | | |

OTHER PUBLICATIONS

Translation of KR 10-2007-0052942 (Year: 2007).*

* cited by examiner

*Primary Examiner* — Gregory A Blankenship
(74) *Attorney, Agent, or Firm* — Spencer Fane, LLP

(57) ABSTRACT

A vehicle trim panel assembly includes a trim panel, a support structure and a first electronic port. The trim panel has a finished surface and a back surface. The trim panel defines an opening that extends from the finished surface to the back surface. The support structure is arranged along the back surface of the trim panel. The first electronic port is supported on the support structure for movement between a first position and a second position such that in the first position the first electronic port is aligned with the opening and is accessed by a vehicle passenger and in the second position the electronic port is moved away from the opening and cannot be accessed by a vehicle passenger.

18 Claims, 11 Drawing Sheets

FIG. 2                 FIG. 3

| 240 — First Motor | Second Motor — 242 |
|---|---|

244 — Electronic Controller

Switch — 246

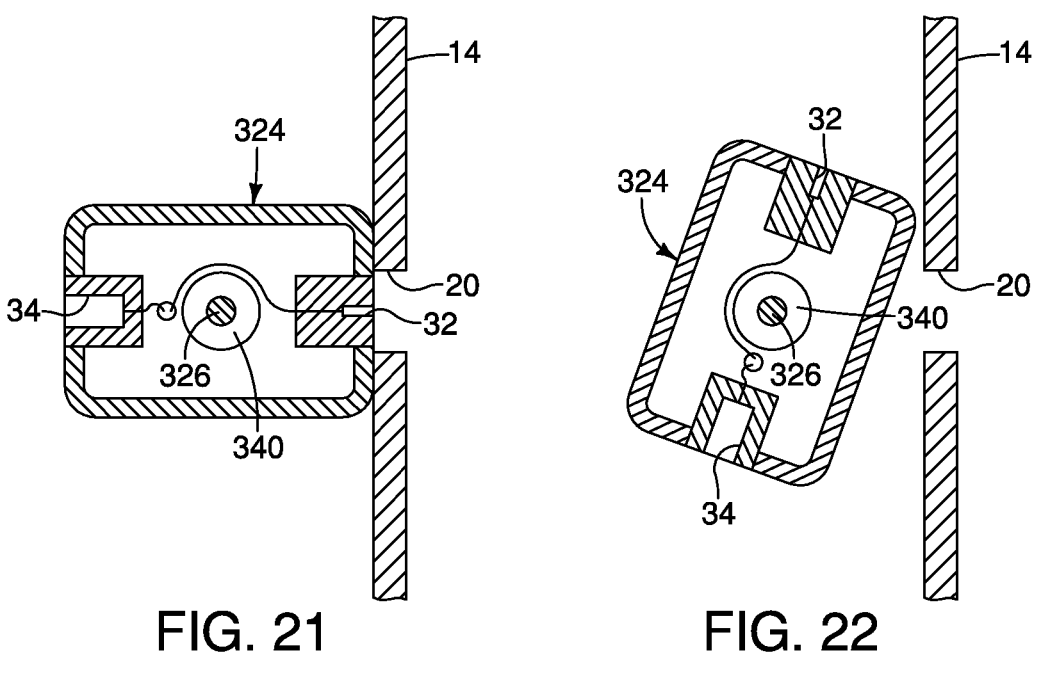
FIG. 21             FIG. 22
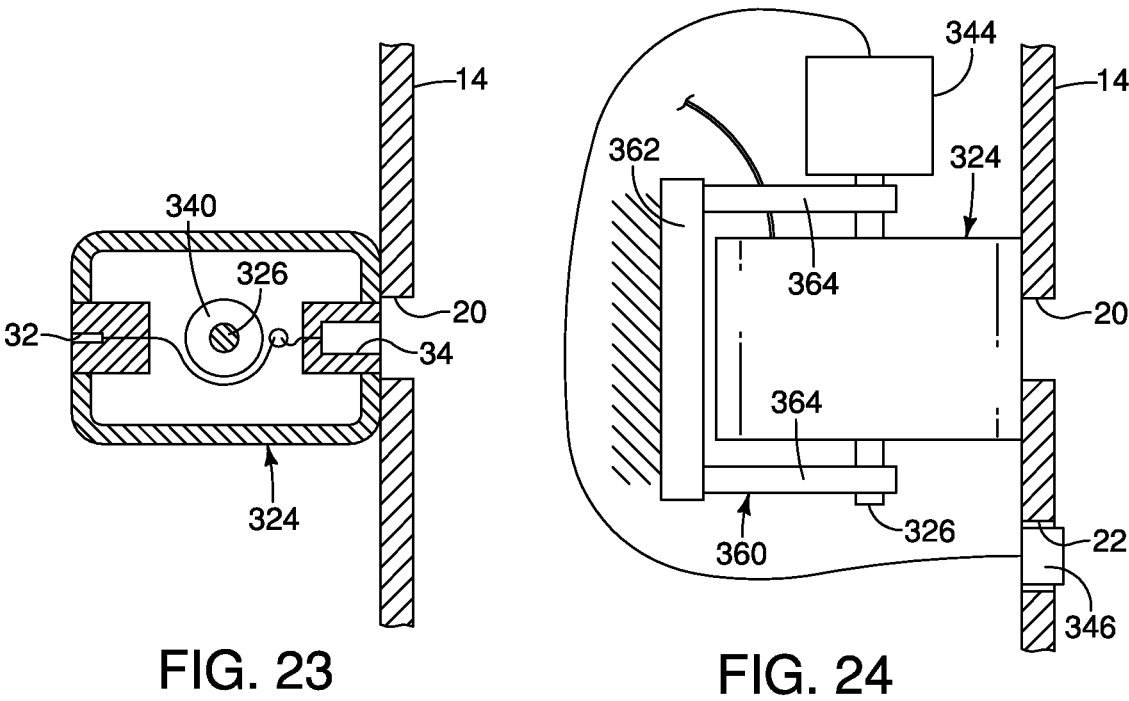
FIG. 23             FIG. 24

VEHICLE TRIM PANEL ASSEMBLY

BACKGROUND

Technical Field

The present disclosure generally relates to vehicle trim panel assembly. More specifically, the present disclosure relates to vehicle trim panel assembly that has a trim panel with an opening for accessing a first electronic port where the first electronic port can be moved away from the opening and a second electronic port can be moved to the opening and accessed therethrough.

Background Information

Vehicle occupants bring electronic devices such as mobile phones into the vehicle passenger compartment in order to plug those devices into an electronic port within the vehicle for battery charging purposes and/or for data communications with an electronic controller and/or audio system of the vehicle. There are many different types of electronic ports that differ in size and shape and in data communication protocols that receive differing types of electronic connectors. Consequently, most vehicles have multiple electronic ports within the vehicle in order to accommodate the different types of electronic plugs.

SUMMARY

One object of the present disclosure is to provide a trim panel with a first electronic port that is access via on opening in the trim panel, where the first electronic port is movable away from the opening in the trim panel and a second electronic port different from the first electronic port can be moved to the opening such that the second electronic port can be accessed through the opening.

In view of the state of the known technology, one aspect of the present disclosure is to provide a vehicle trim panel assembly with a trim panel, a support structure and a first electronic port. The trim panel has a finished surface and a back surface. The trim panel defines an opening that extends from the finished surface to the back surface. The support structure is arranged along the back surface of the trim panel. The first electronic port is supported on the support structure for movement between a first position and a second position such that in the first position the first electronic port is aligned with the opening and is accessed by a vehicle passenger and in the second position the electronic port is moved away from the opening and cannot be accessed by a vehicle passenger.

BRIEF DESCRIPTION OF THE DRAWINGS

Referring now to the attached drawings which form a part of this original disclosure:

FIG. 2 is a cross-sectional view of the trim panel, electronic device and lever mechanism taken along the line 2-2 in FIG. 1 schematically showing details of the lever mechanism with the electronic device moved by the lever mechanism to a first position in accordance with the first embodiment;

FIG. 3 is another cross-sectional view of the trim panel, electronic device and lever mechanism similar to FIG. 2 schematically showing details of the lever mechanism with the electronic device moved by the lever mechanism to a second position in accordance with the first embodiment;

FIG. 21 is a side cross-sectional view of an electronic device and a trim panel showing the electronic device in a first position in accordance with a fourth embodiment;

FIG. 22 is another side cross-sectional view of the electronic device and the trim panel depicted in FIG. 21 showing the electronic device undergoing rotation away from the first position in accordance with the fourth embodiment;

FIG. 23 is yet another side cross-sectional view of the electronic device and the trim panel depicted in FIGS. 21 and 22 showing the electronic device moved to a second position in accordance with the fourth embodiment;

FIG. 24 is a top cross-sectional view of the electronic device and the trim panel depicted in FIGS. 21-23 showing the electronic device in the second position, the electronic device being rotated by a motor in response to pressing of a button or switch that is connected to an electronic controller that operates the motor in accordance with the fourth embodiment;

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
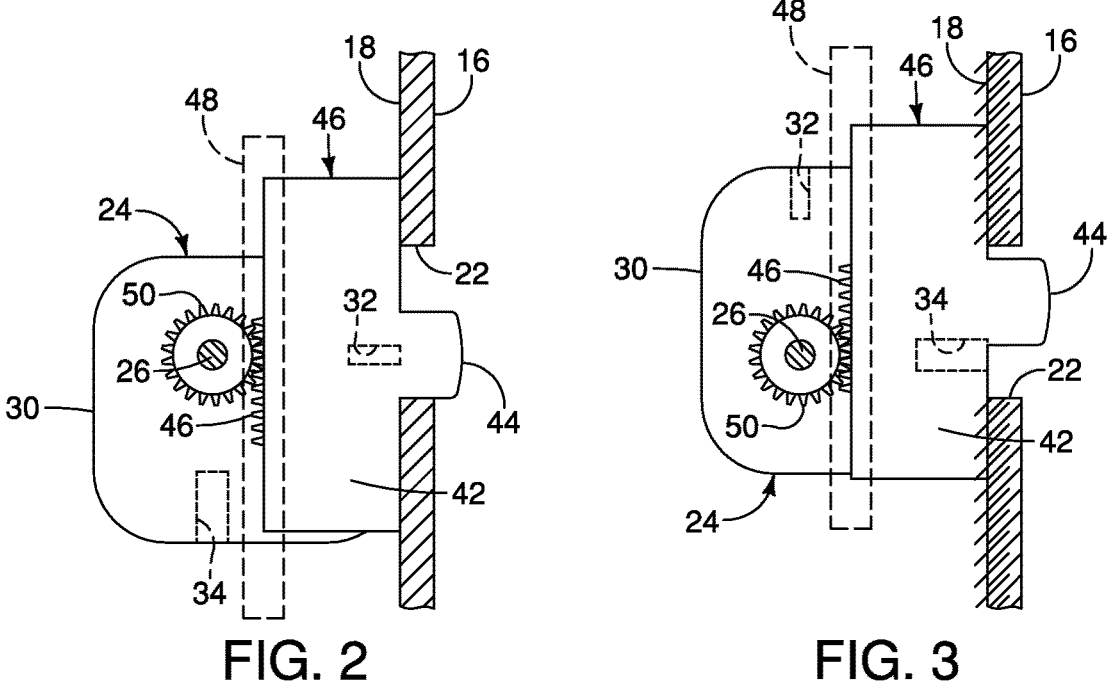
FIG. 1 is a perspective view of an instrument panel of a vehicle showing a trim panel assembly having a trim panel, an electronic device and a lever mechanism in accordance with a first embodiment.

Referring initially to FIG. 1, a vehicle center console assembly 10 that includes a trim panel assembly 12 is illustrated in accordance with a first embodiment. The trim panel assembly 12 is installed to the center console assembly 10 within a passenger compartment of a vehicle.

As shown in FIGS. 2-5, the trim panel assembly 12 includes a trim panel 14 having a finished surface 16 and a back surface 18. The trim panel 14 defines a first opening 20 and a second opening 22 with both the first opening 20 and the second opening 22 extending from the finished surface 16 to the back surface 18.

As shown in FIGS. 2-5, an electronic device 24 is located adjacent to the back surface 18 of the trim panel 14 and is supported by a pivot shaft 26. The pivot shaft 26 is supported by structures (not shown) that can be attached to or otherwise fixed to either the back surface 18 of the trim panel 14 or the center console assembly 10 behind the trim panel 14. The electronic device 24 includes a housing 30 having a first electronic port 32 (hereinafter the first port 32) and a second electronic port 34 (hereinafter the second port 34). The housing 30 is attached to the shaft 26 for rotation therewith.

The first port 32 is an electronic receptacle that can be, for example, a Lightening port, a USB-C port, a micro port or a mini-port configured to receive, respectively, a Lightening connector, a USB-C connector, a micro connector or a mini connector. Preferably, the first port 32 provides a USB 3.0 or 3.1 connection to a corresponding connector with corresponding data transfer protocols and speeds.

The second port 34 can be, for example, a USB-A or USB-B port for receiving USB-A or USB-B connectors. Preferably, the second port 34 is a USB-B port with USB 1.0 and/or 2.0 data transfer protocols and speeds. It should be understood from the description herein that the first port 32 can be for receiving a first type of USB connector for communications and data transfer therewith and the second port 34 can be for receiving a second type of USB connector for communications and data transfer therewith that differs in shape and communication protocols relative to the first port 32. Regardless of the type of port or speed, the first port 32 has a differing shape and possibly differing communication protocols than the second portion 34.

The electronic device 24 includes or is connected to an electrical panel (not shown) that accepts and transmits data to and from each of the first port 32 and the second port 34 via wires connected to the first port 32 and the second port 34. Data transmissions are managed by the electrical panel to and from the first port 32 and to and from the second portion 34 and an electronic controller (not shown) within the vehicle in a conventional manner. Since data communications are conventional electronic features, further description is omitted for the sake of brevity.

In the first embodiment, the housing 30 of the electronic device 24 is able to pivot or rotate about the pivot shaft 26 in response to movement of a lever 40. As shown in FIGS. 2 and 3, the lever 40 includes an elongated portion 42, a knob 44 and gear teeth 46. The lever 40 is retained by a track 48 such that the elongated portion 42 is movable in a vertical direction, as shown by comparing FIGS. 2 and 3. The knob 44 is dimensioned to extend through the second opening 22, as shown in FIGS. 1, 2 and 3. The knob 44 is exposed to the passenger compartment of the vehicle such that a vehicle operator (not shown) or a vehicle passenger (not shown) can push the knob 44 upward and downward, which causes movement upward and downward of the lever 40. The gear teeth 46 of the lever 40 are engaged with a gear 50 that is fixed to the shaft 26. The gear 50 is located outside of the housing 30 and is fixed to the shaft 26. The shaft 26 is fixed to the housing 30. The gear 50 can also be fixed to the housing 30.

Figure 4:
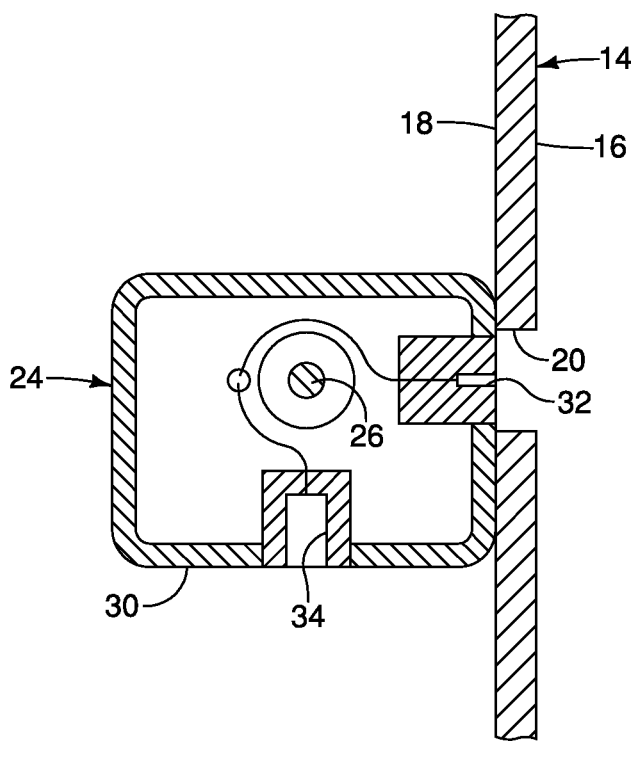
FIG. 4 is a cross-sectional view of the trim panel and electronic device taken along the line 4-4 in FIG. 1 schematically showing the electronic device in the first position corresponding to the depiction in FIG. 2 in accordance with the first embodiment.

Thus, movement of the lever 40 causes pivoting movement or rotation of the housing 30. Specifically, with the knob 44 moved downward (FIGS. 1 and 2) within the second opening 22, the housing 30 of the electrical device 24 is moved to a first position such that the first port 32 is aligned with and exposed thru the first opening 20, as shown in FIGS. 1 and 4. Hence, with the housing 30 in the first position, the first port 32 can be accessed by a person within the vehicle. In the first position, the second port 34 is not accessible.

Figure 5:
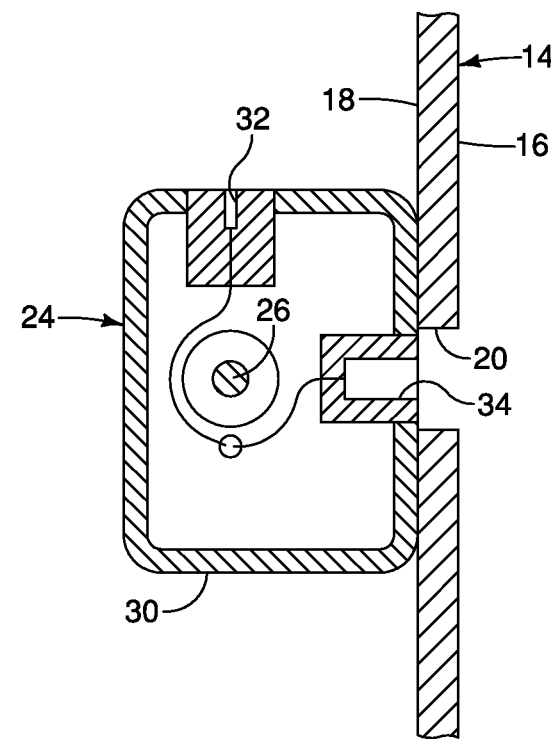
FIG. 5 is another cross-sectional view of the trim panel and electronic device similar to FIG. 4 schematically showing the electronic device in the second position in accordance with the first embodiment.

With the knob 44 moved upward (FIG. 3) within the second opening 22, the housing 30 of the electrical device 24 is pivoted to a second position such that the second port 34 is aligned with and exposed thru the first opening 20, as shown in FIG. 5. Hence, with the housing 30 in the second position, the second port 34 can be accessed by a person within the vehicle. In the second position, the first port 32 is not accessible.

Thus, the first and second ports 32 and 34 can be exposed through the first opening 20 by simple movement of the knob 44. This allows a vehicle operator or a passenger to quickly make accessible for use either the first electronic portion 32 or the second electronic port 34. The needs of the occupants of the vehicle are quickly and easily supplied with movement of the knob 44. Further, the first opening 20 and the second opening 22 can be provided in a space that is smaller than the conventional providing of two separate and different electronic ports, as is typically supplied in current vehicles.

The housing 30 (a rotatable housing) is shaped and dimensioned such that rotation between the first position and the second position is 90 degrees. Further, the housing 30, the pivot shaft 26, the lever 40 and the track 48 define a support structure for the first and second electronic ports 32 and 34.

It should be understood from the drawings and the description herein that the trim panel 14 with the electronic device 24 can be provided at any of a variety of vehicle locations, such as at a front, to or rear surface of a center console within the vehicle or within a cargo area of the vehicle.

SECOND EMBODIMENT

Referring now to FIGS. 6-9, a trim panel 114 and electronic device 124 in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the second embodiment, the trim panel 114 includes the finished surface 16 and the back surface 18, the first opening 20 and the second opening 22, as described in the first embodiment.

In the second embodiment, the electronic device 124 includes a housing 130 that is movable in vertical directions along the back surface 18 of the trim panel 114. The housing 130 includes the first port 32 and the second port 34, with the first and second portion 32 and 34 being as described above with respect to the first embodiment. The first port 32 and the second port 34 are arranged within the housing 130 such that the first portion 32 is vertically above the second port 34. The housing 130 also includes a shaft 126 that is fixed thereto.

Figures 6, 7:
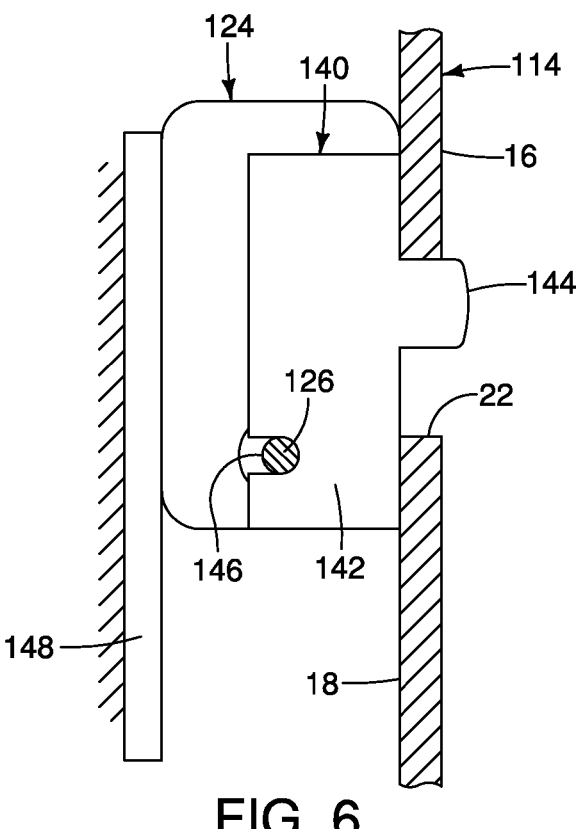
FIG. 6 is a cross-sectional view of a trim panel, an electronic device and la ever mechanism similar to FIG. 2 schematically showing the electronic device moved by the lever mechanism to a first position in accordance with a second embodiment.
FIG. 7 is another cross-sectional view of the trim panel, electronic device and lever mechanism similar to FIG. 3 schematically showing the electronic device moved by the lever mechanism to a second position in accordance with the second embodiment.

As shown in FIGS. 6 and 7, the housing 130 includes a lever 140 that includes an elongated portion 142, a knob 144, a recess 146 and a retaining track 148. The shaft 126 extends into the recess 146, as shown in FIGS. 6 and 7.

With the lever 140 and the shaft 126 of the housing configured as shown in FIGS. 6 and 7, movement of the lever 140 causes linear movement of the housing 130 along the back surface 18 of the trim panel 114.

Figure 8:
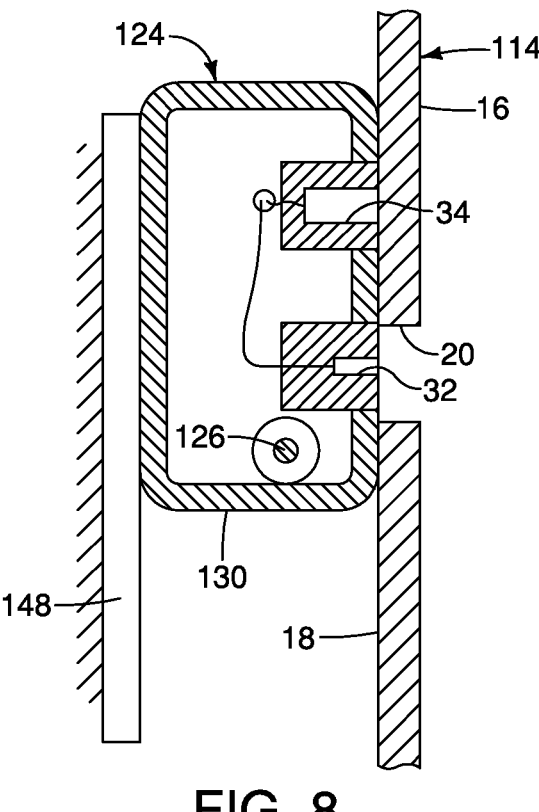
FIG. 8 is a cross-sectional view of the trim panel and electronic device similar to FIG. 4 schematically showing the electronic device in the first position corresponding to the depiction in FIG. 6 in accordance with the second embodiment.

Specifically, with the knob 144 moved upward (FIGS. 6 and 8) within the second opening 22, the housing 130 of the electrical device 124 is moved upward to a first position such that the first port 32 is aligned with and exposed thru the first opening 20, as shown in FIG. 8. Hence, with the housing 130 in the first position, the first port 32 can be accessed by a person within the vehicle. In the first position, the second port 34 is not accessible.

Figure 9:
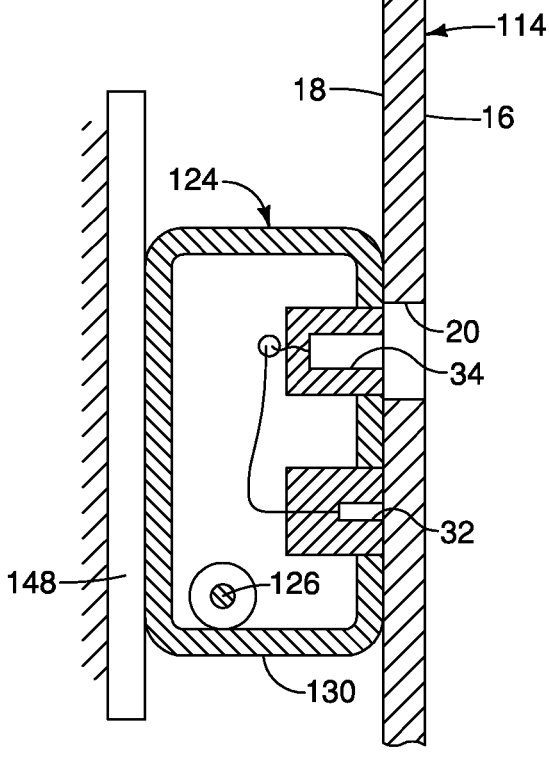
FIG. 9 is another cross-sectional view of the trim panel and electronic device similar to FIG. 4 schematically showing the electronic device in the second position corresponding to the depiction in FIG. 7 in accordance with the second embodiment.

With the knob 44 moved downward (FIG. 7) within the second opening 22, the housing 130 of the electrical device 124 is slid downward to a second position such that the second port 34 is aligned with and exposed thru the first opening 20, as shown in FIG. 9. Hence, with the housing 130 in the second position, the second port 34 can be accessed by a person within the vehicle. In the second position, the first port 32 is not accessible.

In the second embodiment, the housing 130 and the shaft 126 along with the lever 140 define a support structure such that the electronic device 124 supported by the support structure moves the first electronic port 32 and the second electronic port 34 linearly between the first and second positions.

THIRD EMBODIMENT

Referring now to FIGS. 10-20, a trim panel 214 and an electronic device 224 in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, the electronic device 224 includes a housing 230 that is able to pivot or rotate about a pivot shaft 226 in response to operation of a first motor 240 and move in a linear direction in response to operation of a second motor 242. The housing 230 includes the first electronic port 32 and the second electronic port 34, as described above in the first embodiment. The housing 230 includes a first projection 230a that retains and surrounds the first electronic port 32 and a second projection 230b that retains and surrounds the second electronic port 34, as shown in FIGS. 12-16. The first projection 230a and the second projection 230b are dimensioned to be selectively positioned to extend through a first opening 220 of the trim panel 214.

Figures 10, 11:
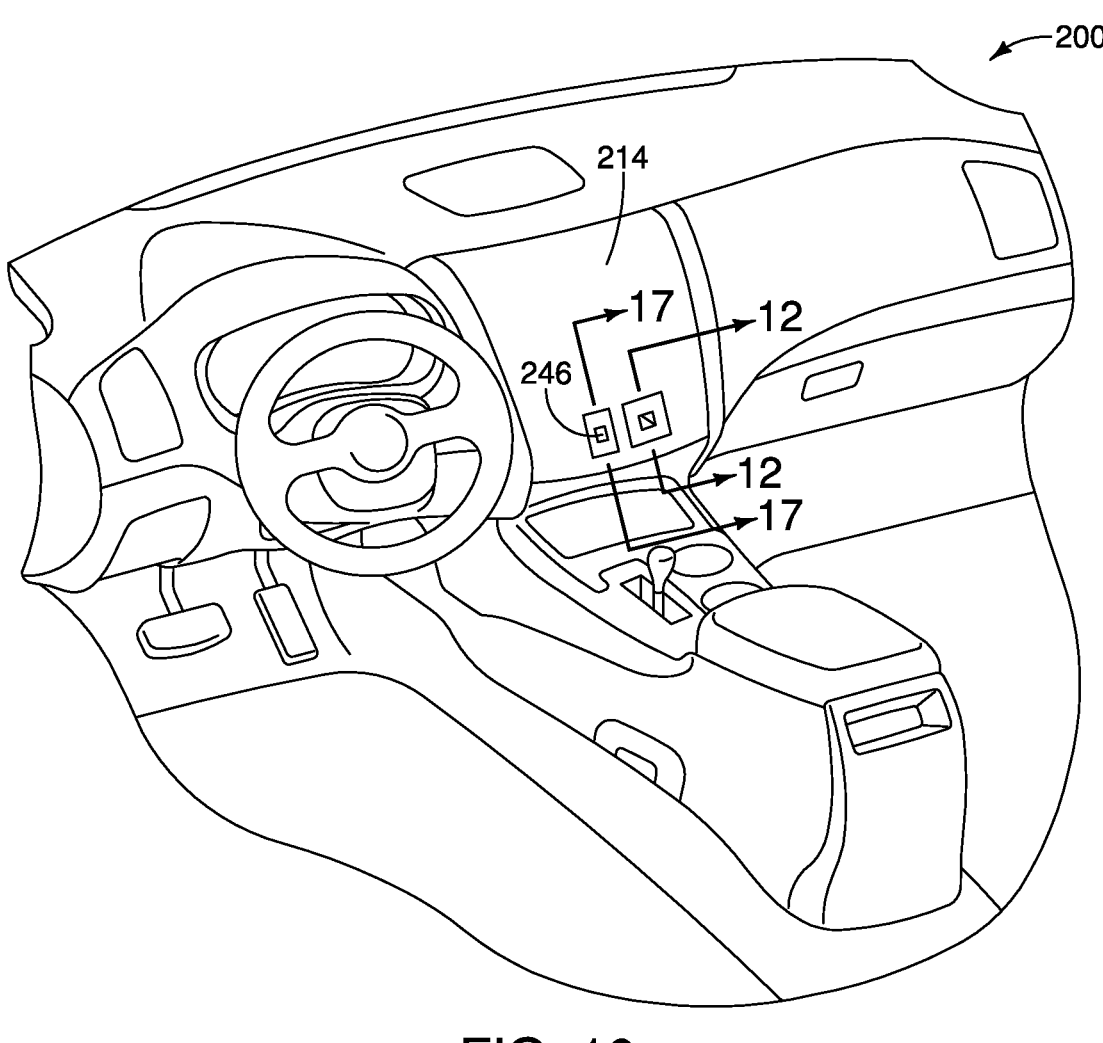
FIG. 10 is a perspective view of an instrument panel of a vehicle showing a trim panel assembly having a trim panel, an electronic device and a switch in accordance with a third embodiment.
FIG. 11 is a block diagram showing the switch electronically connected to an electronic controller, a first motor and a second motor for controlling movement of the electronic device relative to the trim panel in accordance with the third embodiment.

As shown in FIG. 11, the first motor 240 and the second motor 242 are electronically connected to an electronic controller 244. The electronic controller 244 is electrically connected to a button or switch 246. The switch 246 is installed within a second opening 222 of the trim panel 214.

FIGS. 12-16 are side cross-sectional views showing steps of movement of the housing 230, as is described further below. FIGS. 17-20 show several of these steps of movement of the housing 230 from a top cross-sectional view.

Additionally, FIGS. 17-20 show a support structure 260 that includes a vehicle wall 262, support rods 264 and the second motor 242. As shown in FIGS. 17-20, the second motor 242 is defined by two linear motors that contact the support rods 264 and move the support rods 264 linearly in response to instructions from the electronic controller 244. Distal ends of the support rods 264 are connected to the pivot shaft 226. In other words, the pivot shaft 226 is non-movable relative to the support rods 264. The first motor 240 is located within the housing 230 and is fixed to the housing 230. Operation of the first motor 240 causes the housing 230 to rotate about the pivot shaft 226.

Figure 12:
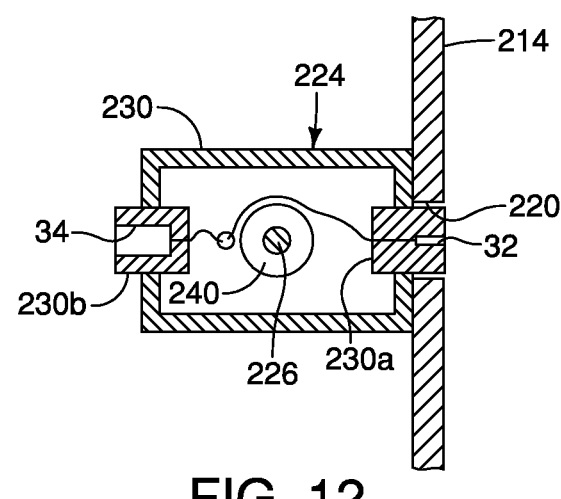
FIG. 12 is a cross-sectional view of the trim panel and the electronic device taken along the line 12-12 in FIG. 10 schematically showing the electronic device in a first position contacting a back surface of the trim panel in accordance with the third embodiment.
Figures 15, 16, 17, 18, 19, 20:
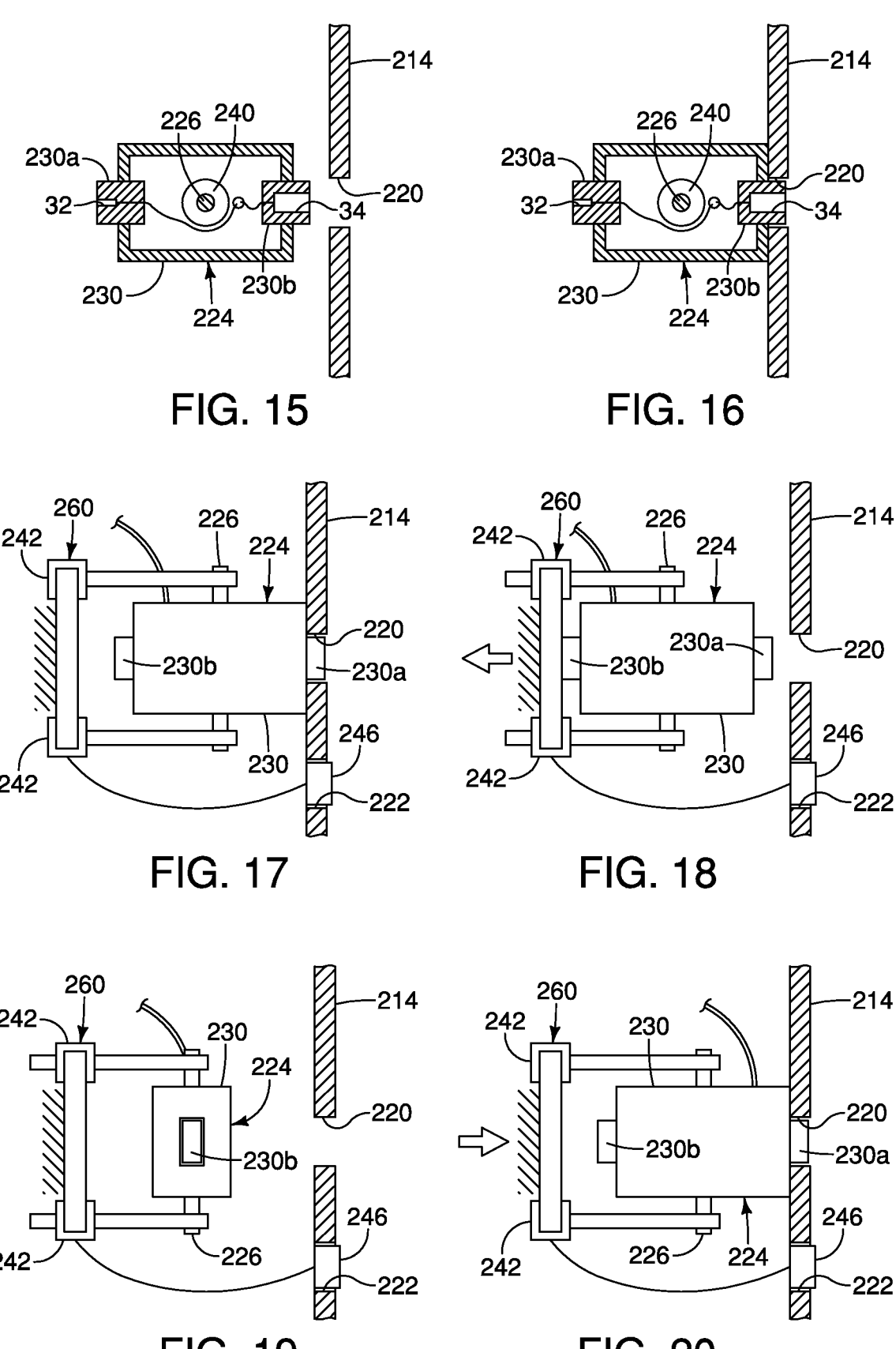
FIG. 15 is yet another cross-sectional view of the trim panel and electronic device similar to FIGS. 12-14 schematically showing the electronic device further rotated in preparation for subsequently moving the electronic device to a second position in accordance with the third embodiment.
FIG. 16 is yet another cross-sectional view of the trim panel and electronic device similar to FIGS. 12-15 schematically showing the electronic device further moved to contact the trim panel such that the electronic device is in the second position in accordance with the third embodiment.
FIG. 17 is a cross-sectional view of the trim panel, the electronic device and a support structure taken along the line 17-17 in FIG. 10 schematically the second motor as a part of the support structure with the electronic device in the first position (corresponding to FIG. 12) contacting a back surface of the trim panel in accordance with the third embodiment.
FIG. 18 is another cross-sectional view of the trim panel, the electronic device and the support structure similar to FIG. 17 schematically showing the electronic device moved to the intermediate position away from the trim panel corresponding to FIG. 13 in accordance with the third embodiment.
FIG. 19 is another cross-sectional view of the trim panel and the electronic device similar to FIGS. 17 and 18 schematically showing the electronic device rotated to another intermediate position corresponding to FIG. 14 in accordance with the third embodiment.
FIG. 20 is yet another cross-sectional view of the trim panel, the electronic device and the support structure similar to FIGS. 17-19 schematically showing the electronic device after further rotation and moved to contact the trim panel such that the electronic device is in the second position (corresponding to FIG. 16) in accordance with the third embodiment.

As shown in FIG. 12, with the housing 230 in a first orientation or first position, the first projection 230a is located within the first opening 220 such that the first electronic port 32 is exposed via the first opening 220 and can be used by a vehicle passenger for data transmission between an onboard vehicle computer/electronic controller (not shown) and a device operated by the passenger. FIG. 17 also shows the housing 230 in the first position.

Figure 13:
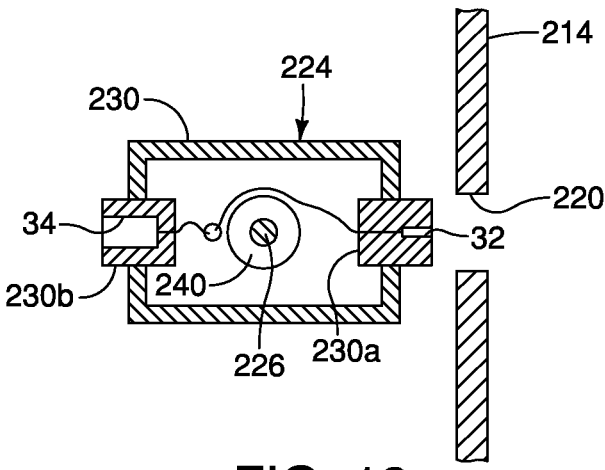
FIG. 13 is another cross-sectional view of the trim panel and the electronic device similar to FIG. 12 schematically showing the electronic device moved to an intermediate position away from the trim panel in accordance with the third embodiment.
Figure 14:
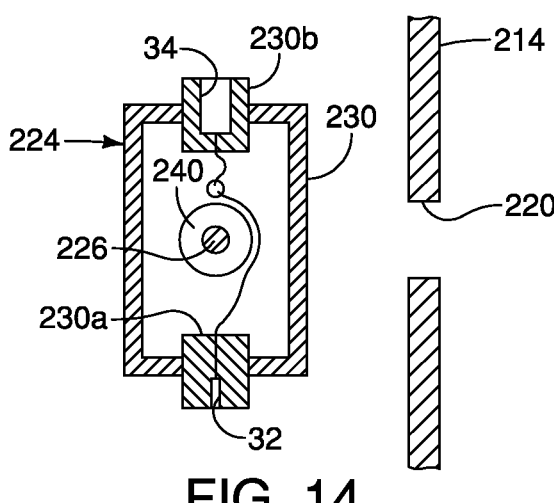
FIG. 14 is another cross-sectional view of the trim panel and the electronic device similar to FIGS. 12 and 13 schematically showing the electronic device rotated to another intermediate position in accordance with the third embodiment.

In FIGS. 13 and 18, the housing 230 is moved away from the trim panel 214 by operation of the linear motors 242 such that the first projection 230a is pulled out of the first opening 220. Next, in FIGS. 14 and 19, the housing 230 is rotated part way (90 degrees) by operation of the first motor 240 and then a full 180 degrees as shown in FIG. 15. Next, as shown in FIGS. 16 and 20, the housing 230 is moved back toward the trim panel 214 until the second projection 230b and the second electronic port 34 are positioned in the first opening 220. As shown in FIGS. 16 and 20, the housing 230 is oriented in the second position with the second electronic port 34 being exposed within the first opening 220 for use by a passenger within the vehicle.

The operation of the first motor 240 and the second motor 242 is initiated when a vehicle passenger presses the button or switch 246. The switch 246 sends a signal to the electronic controller 244. The electronic controller 244 is programmed or hardwired to operate the motors 240 and 242 to toggle the housing 230 between the first position (FIGS. 12 and 17) and the second position (FIGS. 16 and 20), which includes 180 degree rotation of the housing 230.

FOURTH EMBODIMENT

Referring now to FIGS. 21-24, the trim panel 14 and an electronic device 324 in accordance with a fourth embodiment will now be explained. In view of the similarity between the first and fourth embodiments, the parts of the fourth embodiment that are identical to the parts of the first embodiment will be given the same reference numerals as the parts of the first embodiment. Moreover, the descriptions of the parts of the fourth embodiment that are identical to the parts of the first embodiment may be omitted for the sake of brevity.

The electronic device 324 of the fourth embodiment includes a housing 330, the first and second electronic ports 32 and 34 (as described above with respect to the first embodiment), a pivot shaft 326, a motor 340 and a support structure 360 (shown in FIG. 24).

The housing 330 is rotatable about the pivot shaft 326 in response to operation of the motor 340. The motor 340 is fixed within and to the housing 330 such that operation of the motor 340 causes the housing 330 and the motor 340 to rotate about the shaft 326.

The support structure 360 includes support rods 364 that are secured to a vehicle wall 362. The shaft 326 is non-rotatable fixed to the support rods 364.

The motor 340 of the electronic device 324 is electronically connected to an electronic controller 344 that is further connected to a button or switch 346 (FIG. 24). The electronic device 324 operates as follows. A vehicle passenger presses the switch 346 such that a signal is sent to the electronic controller 344. In response, the electronic controller 344 operates the motor 340 to rotate the housing 330 between a first position depicted in FIG. 21 to a second position in FIG. 23. When the switch 346 is pressed again, the electronic controller 344 operates to motor 340 to rotate the housing 330 in an opposite direction moving from the second position depicted in FIG. 23 to the first position in FIG. 21.

With the housing 330 in the first position, the first electronic port 32 aligned with the first opening 20 such that the first electronic port 32 is exposed via the first opening 20 and can be used by a vehicle passenger for data transmission between an onboard vehicle computer/electronic controller (not shown) and a device operated by the passenger. With the housing 330 in the second position, the second electronic port 34 aligned with the first opening 20 such that the second electronic port 34 is exposed via the first opening 20 and can be used by a vehicle passenger for data transmission between an onboard vehicle computer/electronic controller (not shown) and a device operated by the passenger.

FIFTH EMBODIMENT

Figure 25:
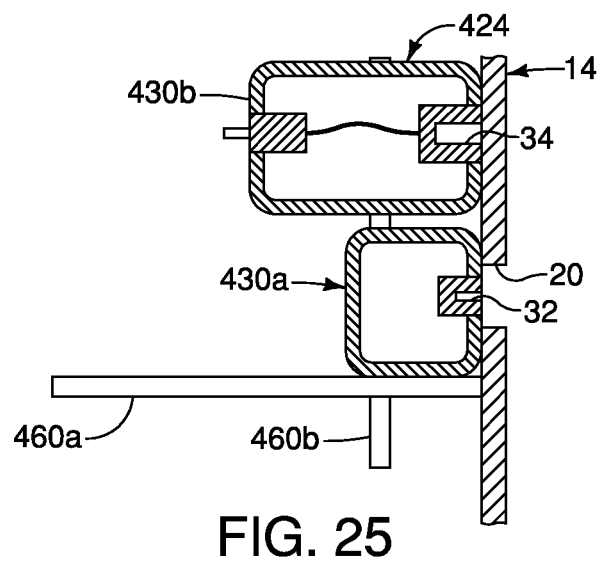
FIG. 25 is a side cross-sectional view of an electronic device having a first housing, a first linear track, a second housing, a second linear track and a trim panel showing the first housing of the electronic device in a first position in accordance with a fifth embodiment.
Figure 26:
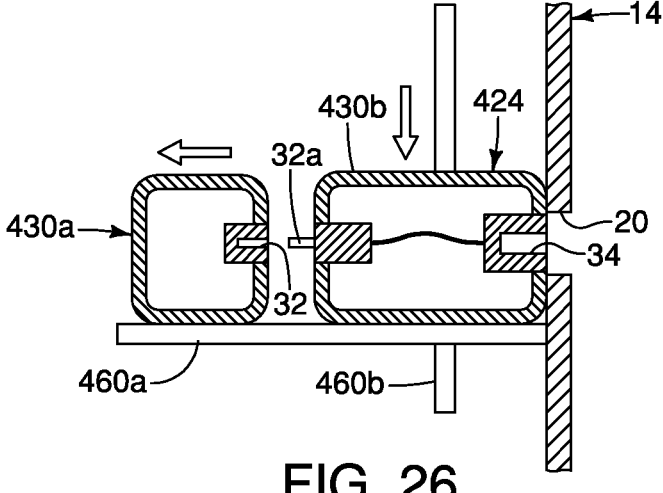
FIG. 26 is another side cross-sectional view of the electronic device and the trim panel depicted in FIG. 25 showing the first housing of the first electronic device moved horizontally along the first linear track away from the trim panel and the first position and the second housing being moved vertically downward along the second linear track such that the second housing of the electronic device is in the second position in accordance with the fifth embodiment.
Figure 27:
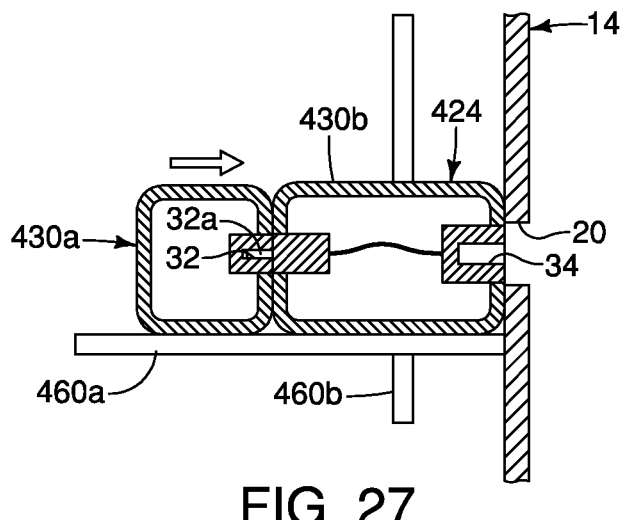
FIG. 27 is yet another side cross-sectional view of the electronic device and the trim panel depicted in FIGS. 25-27 showing the first housing of the electronic device moved to electronically connect with the second housing of the electronic device in accordance with the fifth embodiment.

Referring now to FIGS. 25-27, the trim panel 14 and an electronic device 424 in accordance with a fifth embodiment will now be explained. In view of the similarity between the first and fifth embodiments, the parts of the fifth embodiment that are identical to the parts of the first embodiment will be given the same reference numerals as the parts of the first embodiment. Moreover, the descriptions of the parts of the fifth embodiment that are identical to the parts of the first embodiment may be omitted for the sake of brevity.

In the fifth embodiment, the electronic device 424 includes a first housing 430*a* and a second housing 430*b* that are supported by a first linear track 460*a* and a second linear track 460*b*, respectively. The first linear track 460*a* and the second linear track 460*b* are non-movable supported relative the trim panel 14. The first port 32 is installed in the first housing 430*a* and the second port 34 is installed in the second housing 430*b*. The first housing 430*a* is supported for horizontal movement by the first linear track 460*a* such that the first port 32 moves along the first linear track 460*a* between the first position (FIG. 25) and the second position (FIG. 27). In the first position, the first electronic port 32 is located at the first opening 20 for use by a vehicle passenger. In the second position, the first electronic portion 32 is spaced apart from the first opening 20 in the trim panel 14.

The second housing 430*b* is supported by the second linear track 460*b* for linear movement with the second linear track 460*b* being perpendicular to the first linear track 460*a*.

The electronic device 424 further includes the electronic controller 244, a first motor (not shown in FIGS. 25-27) that is connected and within the first linear track 460*a*, a second motor (not shown) that is connected to and within the second linear track 460*a* and the switch 246 (not shown in FIGS. 25-27), as described above with respect to the second embodiment.

When the switch 246 is pressed, the first housing 430*a* and the first port 32 are moved linearly away from the trim panel 14 by the first motor in the first linear track 460*a*, as shown in FIG. 26. Next, the second housing 430*b* is moved linearly downward along the trim panel 14 by the second motor in the second linear track 460*b* until the second port 34 is aligned and exposed via the first opening 20, as shown in FIG. 27. Finally, the first housing 430*a* is moved slightly forward such that a connector 32*a* can be moved into the first port 32. Thus, the second port 34 can be accessed by a vehicle occupant for connecting a USB-2.0 connector thereto. The second housing 430*b* includes wiring and circuitry that enables transfer of data between the first port 32 and the second port 34.

SIXTH EMBODIMENT

Figure 28:
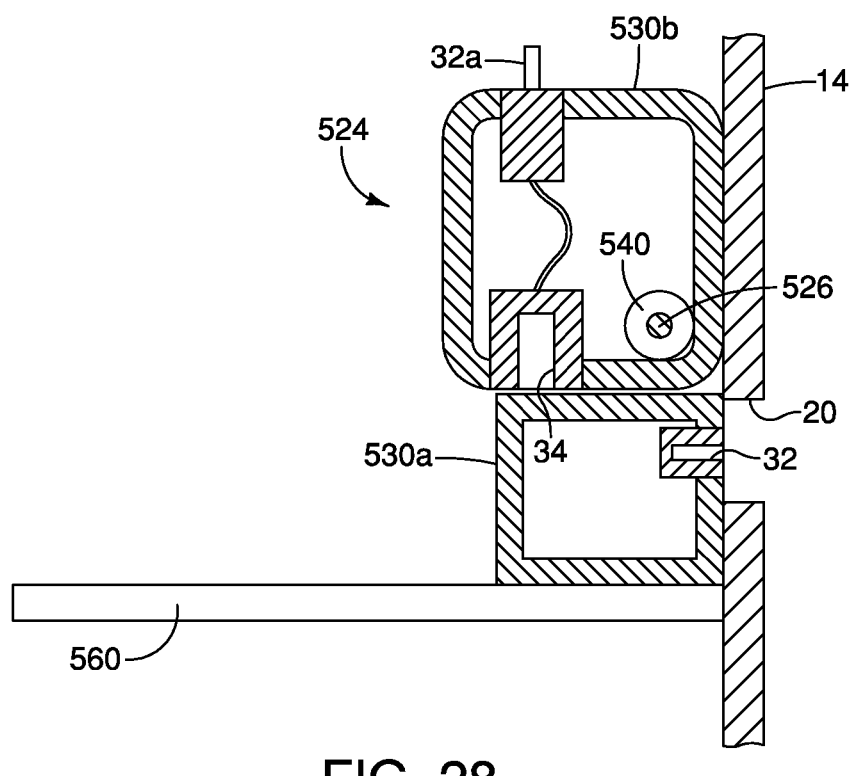
FIG. 28 is a side cross-sectional view of an electronic device having a first housing, a first linear track, a second housing, a pivot shaft and a trim panel showing the first housing of the electronic device in a first position and the second housing of the electronic device pivoted upward and away from an opening in the trim panel in accordance with a sixth embodiment.

Referring now to FIGS. 28-22, the trim panel 14 and an electronic device 524 in accordance with a sixth embodiment will now be explained. In view of the similarity between the first and sixth embodiments, the parts of the sixth embodiment that are identical to the parts of the first embodiment will be given the same reference numerals as the parts of the first embodiment. Moreover, the descriptions of the parts of the sixth embodiment that are identical to the parts of the first embodiment may be omitted for the sake of brevity.

In the sixth embodiment, the electronic device 524 includes a first housing 530*a* and a second housing 530*b*. The first housing 530*a* is supported by a first linear track 560*a*. The second housing 530*b* is supported by a shaft 526 having a motor 540 associated therewith. The first linear track 560*a* and the pivot shaft 526 are non-movable supported relative to the trim panel 14. The motor 540 is fixedly attached to and within the second housing 530*b*.

Figure 29:
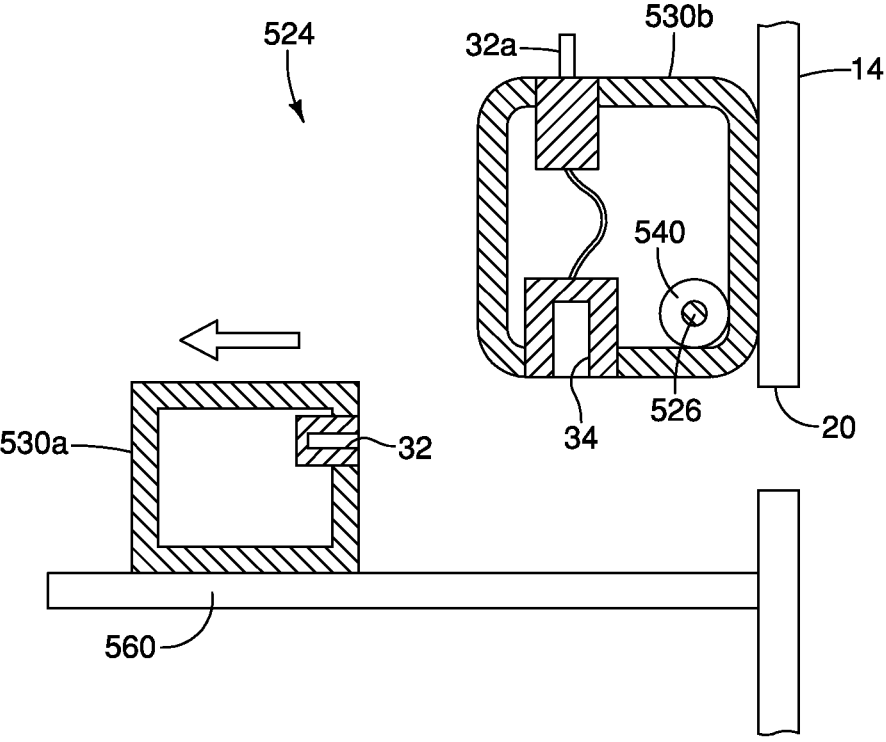
FIG. 29 is another side cross-sectional view of the electronic device and the trim panel depicted in FIG. 28 showing the first housing of the first electronic device moved horizontally along the first linear track away from the first position in accordance with the sixth embodiment.
Figures 30, 31, 32:
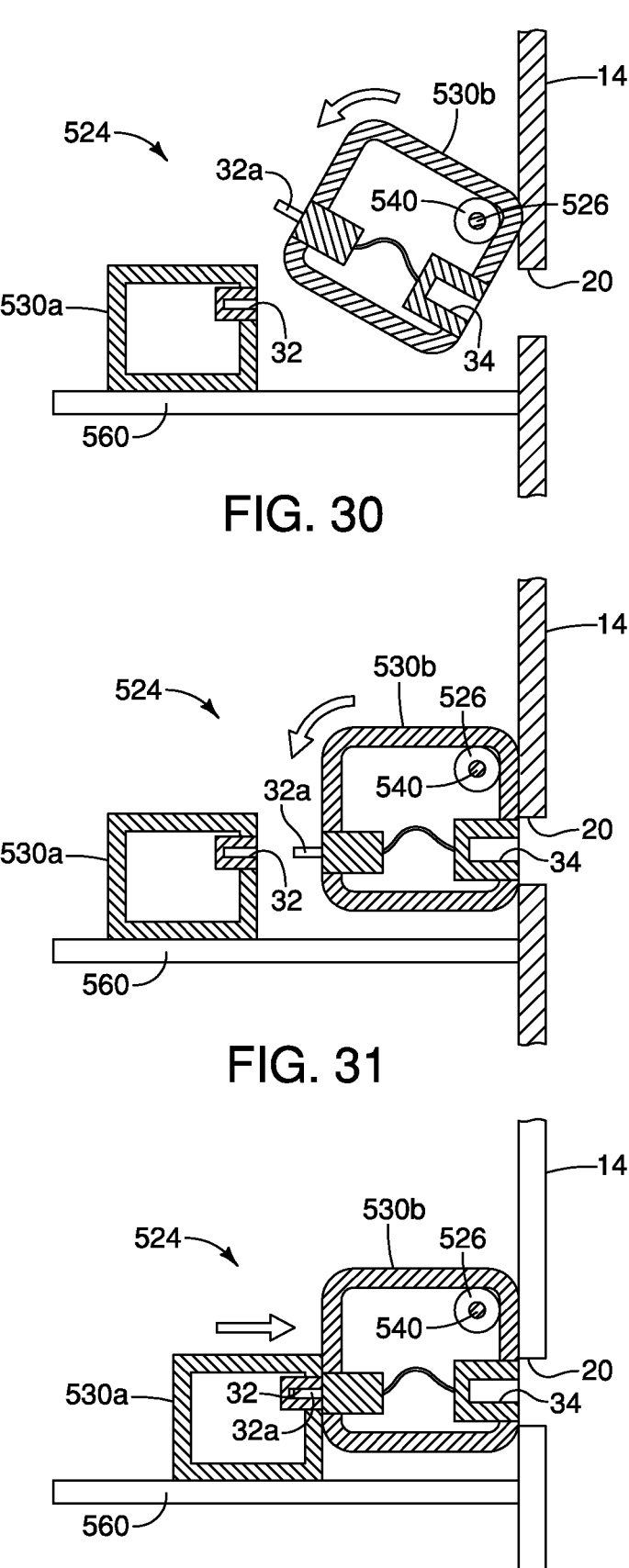
FIG. 30 is another side cross-sectional view of the electronic device and the trim panel depicted in FIGS. 28 and 29 showing the second housing of the first electronic device being pivoted downward by an electric motor toward the second position in accordance with the sixth embodiment.
FIG. 31 is another side cross-sectional view of the electronic device and the trim panel depicted in FIGS. 28-30 showing the second housing of the first electronic device pivoted by the electric motor to the second position in accordance with the sixth embodiment.
FIG. 32 is yet another side cross-sectional view of the electronic device and the trim panel depicted in FIGS. 28-31 showing the first housing of the electronic device moved linearly to electronically connect with the second housing in accordance with the sixth embodiment.

The first port 32 is installed in the first housing 530*a* and the second port 34 is installed in the second housing 530*b*. The first housing 530*a* is supported for horizontal movement by the first linear track 560*a* such that the first port 32 moves along the first linear track 560*a* between the first position (FIG. 28) and the second position (FIG. 29-31). In the first position, the first electronic port 32 is located at the first opening 20 for use by a vehicle passenger. In the second position, the first electronic portion 32 is spaced apart from the first opening 20 in the trim panel 14.

The second housing 530*b* is supported by the pivot shaft 526 for pivot movement.

When the switch (not shown) is pressed, the first housing 530*a* and the first port 32 are moved linearly away from the trim panel 14 by a first motor in the first linear track 460*a*, as shown in FIG. 29. Next, the second housing 530*b* is pivoted downward relative to the trim panel 14 by the motor 540 as shown in FIG. 30 until the second port 34 is aligned and exposed via the first opening 20, as shown in FIG. 31. Finally, the first housing 430*a* is moved toward the second housing 530*b* such that a connector 32*a* of the second housing 530*b* can be moved into the first port 32. Thus, the second port 34 can be accessed by a vehicle occupant for connecting a USB-2.0 connector thereto. The second housing 530*b* includes wiring and circuitry that enables transfer of data between the first port 32 and the second port 34.

The electronic controller, switch and motor(s) shown in FIG. 11 are present in each of the above embodiments where a motor or motors are employed to move the electronic device between the various described embodiments with a motor or motors. For the sake of brevity, the description of the electronic controller, switch and motor(s) shown in FIG. 11 is omitted from the fourth, fifth and sixth embodiments for the sake of brevity.

The electronic controller preferably includes a microcomputer with a control program that controls the motor or motors in response to manual operation of the button or switch, as discussed above. The electronic controller can also include other conventional components such as an input interface circuit, an output interface circuit, and storage devices such as a ROM (Read Only Memory) device and a RAM (Random Access Memory) device. The microcomputer of the electronic controller is programmed to control each of the motor or motors described above. The electronic controller is operatively coupled to the switch and motor or motors in a conventional manner. The internal RAM of the electronic controller stores statuses of operational flags and various control data. The internal ROM of the electronic controller stores the operational steps for various operations of the motor or motors.

The various elements of the vehicle instrument panel depicted in FIG. 1 (other than the trim panel assembly and embodiments of the electronic devices) described above are conventional components that are well known in the art. Since instrument panels and vehicles components are well known in the art, these structures will not be discussed or illustrated in detail herein. Rather, it will be apparent to those skilled in the art from this disclosure that the components can be any type of structure and/or programming that can be used to carry out the present invention.

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiments, the following directional terms "forward", "rearward", "above", "downward", "vertical", "horizontal", "below" and "transverse" as well as any other similar directional terms refer to those directions of a vehicle equipped with the vehicle trim panel assembly. Accordingly, these terms, as utilized to describe the present invention should be interpreted relative to a vehicle equipped with the vehicle trim panel assembly.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such features. Thus, the foregoing descriptions of the embodiments according to the present invention are provided for illustration only, and not for the purpose of limiting the invention as defined by the appended claims and their equivalents.

What is claimed is:

1. A vehicle trim panel assembly, comprising:
a trim panel having a finished surface and a back surface, the trim panel defining an opening that extends from the finished surface to the back surface;
a support structure arranged along the back surface of the trim panel;
a first electronic port supported on the support structure, and
a second electronic port supported on the support structure, the first electronic port and the second electronic support supported on the support structure for movement between a first position and a second position such that in the first position, the first electronic port is aligned with the opening and is accessible by a vehicle passenger and the second electronic port cannot be accessed, and in the second position, the first electronic port is moved away from the opening and cannot be accessed by the vehicle passenger and the second electronic port is accessible by the vehicle passenger.

2. The vehicle trim panel assembly according to claim 1, wherein the first electronic port supported by the support structure that moves the first electronic port linearly between the first and second positions.

3. The vehicle trim panel assembly according to claim 2, wherein
the trim panel defines a slot adjacent to the opening,
the first electronic port being fixed within a housing dimensioned and position to slide along the back surface of the trim panel, the housing also including a second electronic port, and
the support structure includes a lever having an elongated portion with a recess and a knob that extends at least partway through the slot, with the recess being engaged with a portion of the housing such that in response to the knob being moved vertically within the slot relative to the housing and the first electronic port are moved vertically relative to the trim panel such that in the first position the first electronic port is accessible via the opening in the trim panel and in the second position the second electronic port is accessible via the opening in the trim panel.

4. The vehicle trim panel assembly according to claim 1, wherein
the first electronic port is supported by the support structure that rotates the first electronic port between the first and second positions.

5. The vehicle trim panel assembly according to claim 4, wherein
the rotatable housing is shaped and dimensioned such that rotation between the first position and the second position is 90 degrees.

6. The vehicle trim panel assembly according to claim 4, wherein
the rotatable housing is shaped and dimensioned such that rotation between the first position and the second position is 180 degrees.

7. The vehicle trim panel assembly according to claim 1, wherein
the second electronic port has different overall dimensions from the first electronic port, and
the first electronic port the second electronic port are installed in a rotatable housing that is rotatable to the first position such that the first electronic port is accessible via the opening in the trim panel and is rotatable to the second position such that the second electronic port is accessible via the opening in the trim panel.

8. The vehicle trim panel assembly according to claim 7, wherein
the trim panel defines a slot adjacent to the opening,
the rotatable housing includes a pivot shaft extending therethrough, the pivot shaft being fixedly attached to a gear with gear teeth, and
the support structure includes a lever having an elongated portion with a plurality of gear teeth and a knob that extends at least partway through the slot, the gear teeth of the elongated portion being engaged with the gear teeth of the gear attached to the pivot shaft such that in response to the knob being moved vertically within the slot relative to the trim panel the housing is rotatable between the first position in which the first electronic port is accessible via the opening in the trim panel and the second position in which the second electronic port is accessible via the opening in the trim panel.

9. The vehicle trim panel assembly according to claim 7, wherein the rotatable housing is shaped and dimensioned such that rotation between the first position and the second position is 90 degrees.

10. The vehicle trim panel assembly according to claim 7, wherein the rotatable housing includes a pivot shaft extending therethrough, the pivot shaft being attached to a motor within the rotatable housing such that operation of the motor moves the rotatable housing between the first position and the second position.

11. The vehicle trim panel assembly according to claim 10, wherein the rotatable housing is shaped and dimensioned such that rotation between the first position and the second position is 180 degrees.

12. The vehicle trim panel assembly according to claim 1, wherein the first electronic port is installed in a first housing and a second electronic port is installed in a second housing, the first housing being supported by a first linear track such that the first electronic port moves along the first linear track between the first position adjacent to the opening in the trim panel and the second position with the first electronic port being spaced apart from the opening in the trim panel, and the second housing is supported by a second linear track that is perpendicular to the first linear track such that with the first housing in the second position, the second housing is movable linearly along the second track to bring the second electronic port into alignment with the opening in the trim panel such that the second electronic port is accessible through the opening.

13. The vehicle trim panel assembly according to claim 1, wherein the first electronic port is installed in a first housing and a second electronic port is installed in a second housing, the first housing being supported by a first linear track such that the first housing and the first electronic port move along the first linear track between the first position adjacent to the opening in the trim panel and the second position with the first electronic port being spaced apart from the opening in the trim panel, and the second housing is supported by a pivot shaft such that with the first housing in the second position, the second housing is pivotable about the pivot shaft bringing the second electronic port into alignment with the opening in the trim panel such that the second electronic port is accessible through the opening.

14. The vehicle trim panel assembly according to claim 1, wherein the first electronic port is configured to move in a planar direction between the first position and the second position.

15. The vehicle trim panel assembly according to claim 1, wherein the support structure includes a housing in which the first electronic port and the second electronic port are provided.

16. The vehicle trim panel assembly according to claim 1, wherein the first electronic port is selected from the group consisting of: a lightening port, a USB-C port, a micro port and a mini-port.

17. The vehicle trim panel assembly according to claim 1, wherein the second electronic port is selected from the group consisting of: a USB-A port and a USB-B port.

18. A vehicle trim panel assembly, comprising:

a trim panel having a finished surface and a back surface, the trim panel defining an opening that extends from the finished surface to the back surface;

a support structure arranged along the back surface of the trim panel;

a first electronic port supported on the support structure for movement between a first position and a second position such that in the first position the first electronic port is aligned with the opening and is accessed by a vehicle passenger and in the second position the electronic port is moved away from the opening and cannot be accessed by a vehicle passenger; and a second electronic port having different overall dimensions from the first USP port, the first electronic port the second electronic port installed in a rotatable housing that is rotatable to the first position such that the first electronic port is accessible via the opening in the trim panel and is rotatable to the second position such that the second electronic port is accessible via the opening in the trim panel, the trim panel defining a slot adjacent to the opening, the rotatable housing including a pivot shaft extending therethrough, the pivot shaft being fixedly attached to a gear with gear teeth, and the support structure including a lever having an elongated portion with a plurality of gear teeth and a knob that extends at least partway through the slot, the gear teeth of the elongated portion being engaged with the gear teeth of the gear attached to the pivot shaft such that in response to the knob being moved vertically within the slot relative to the trim panel the housing is rotatable between the first position in which the first electronic port is accessible via the opening in the trim panel and the second position in which the second electronic port is accessible via the opening in the trim panel a lever having an elongated portion with a plurality of gear teeth and a knob that extends at least partway through the slot, the gear teeth of the elongated portion being engaged with the gear teeth of the gear attached to the pivot shaft such that in response to the knob being moved vertically within the slot relative to the trim panel the housing is rotatable between the first position in which the first electronic port is accessible via the opening in the trim panel and the second position in which the second electronic port is accessible via the opening in the trim panel.

* * * * *